United States Patent
Solbrig et al.

(10) Patent No.: US 8,713,917 B2
(45) Date of Patent: May 6, 2014

(54) METHOD FOR REDUCING NH3 RELEASE FROM SCR CATALYSTS DURING THERMAL TRANSIENTS

(75) Inventors: Charles E. Solbrig, Ypsilanti, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 1330 days.

(21) Appl. No.: 12/029,644

(22) Filed: Feb. 12, 2008

(65) Prior Publication Data
US 2009/0056315 A1 Mar. 5, 2009

Related U.S. Application Data

(60) Provisional application No. 60/966,844, filed on Aug. 30, 2007.

(51) Int. Cl.
*F01N 3/20* (2006.01)

(52) U.S. Cl.
USPC .................................. 60/286; 60/295; 60/301

(58) Field of Classification Search
USPC ..................................... 60/274, 286, 301, 295
See application file for complete search history.

(56) References Cited

U.S. PATENT DOCUMENTS

| | | | |
|---|---|---|---|
| 4,314,345 A * | 2/1982 | Shiraishi et al. | 700/271 |
| 4,403,473 A | 9/1983 | Gladden | |
| 4,473,536 A | 9/1984 | Carberg et al. | |
| 4,963,332 A | 10/1990 | Brand et al. | |
| 5,522,218 A | 6/1996 | Lane et al. | |
| 5,628,186 A | 5/1997 | Schmelz | |
| 5,643,536 A | 7/1997 | Schmelz | |
| 5,785,937 A | 7/1998 | Neufert et al. | |
| 5,833,932 A | 11/1998 | Schmelz | |
| 5,842,341 A | 12/1998 | Kibe | |
| 5,845,487 A | 12/1998 | Fraenkle et al. | |
| 6,546,720 B2 | 4/2003 | van Nieuwstadt | |
| 6,662,553 B2 | 12/2003 | Patchett et al. | |
| 6,993,900 B2 | 2/2006 | Upadhyay et al. | |
| 7,178,328 B2 | 2/2007 | Solbrig | |
| 7,707,824 B2 | 5/2010 | Solbrig | |
| 2004/0040289 A1 | 3/2004 | Mazur et al. | |
| 2004/0098974 A1 | 5/2004 | Nieuwstadt et al. | |
| 2004/0128982 A1 * | 7/2004 | Patchett et al. | 60/274 |
| 2004/0226286 A1 | 11/2004 | Gabrielsson et al. | |
| 2005/0262829 A1 * | 12/2005 | Itoh et al. | 60/278 |
| 2006/0130458 A1 | 6/2006 | Solbrig | |
| 2006/0130461 A1 * | 6/2006 | Gabrielsson et al. | 60/286 |
| 2006/0276956 A1 * | 12/2006 | Johnson | 701/115 |
| 2008/0216463 A1 | 9/2008 | Chaineux et al. | |
| 2009/0049828 A1 * | 2/2009 | Wei et al. | 60/295 |

FOREIGN PATENT DOCUMENTS

| | | | | |
|---|---|---|---|---|
| CN | 1609420 A | 4/2005 | | |
| DE | 10043798 A1 * | 3/2002 | | B01D 53/86 |
| DE | 10228660 A1 | 1/2004 | | |
| JP | 2006138273 A | 6/2006 | | |
| JP | 2006274844 A * | 10/2006 | | |

* cited by examiner

*Primary Examiner* — Thomas Denion
*Assistant Examiner* — Jonathan Matthias

(57) ABSTRACT

A control system includes a temperature module that determines a temperature of a selective catalytic reduction (SCR) catalyst, a derivative module that determines a derivative of the temperature, and a dosing module that regulates a dosage of a reductant supplied to the SCR catalyst to regulate an engine out NOx level. A control module generates control signals based on the temperature derivative, wherein the control signals regulate an amount of reductant accumulated within the SCR catalyst to reduce reductant release from the SCR catalyst during thermal transients.

22 Claims, 4 Drawing Sheets

METHOD FOR REDUCING NH3 RELEASE FROM SCR CATALYSTS DURING THERMAL TRANSIENTS

CROSS-REFERENCE TO RELATED APPLICATIONS

This application claims the benefit of U.S. Provisional Application No. 60/966,844, filed on Aug. 30, 2007. The disclosure of the above application is incorporated herein by reference.

FIELD

The present disclosure relates to exhaust treatment systems, and more particularly to reducing NH3 release from selective catalytic reduction catalysts during thermal transients.

BACKGROUND

The statements in this section merely provide background information related to the present disclosure and may not constitute prior art.

Selective Catalytic Reduction (SCR) of NOx using ammonia (NH3) as a reductant is well established for NOx emissions reduction on stationary sources and mobile applications such as diesel engines. In the SCR process, NOx reacts with the reductant, such as a pure anhydrous ammonia, aqueous ammonia, or urea, which is injected by a dosing system into the flue or exhaust gas stream to be absorbed onto a SCR catalyst. The injected dosing agent (e.g. urea) breaks down to form ammonia (NH3), which is the reductant utilized to react with the NOx. The following exemplary, chemical relationships describe the NOx reduction:

$$4NO + 4NH_3 + O_2 \rightarrow 4N_2 + 6H_2O$$

$$4NH_3 + 2NO + 2NO \rightarrow 4N_2 + 6H_2O$$

$$3NO_2 + 4NH_3 \rightarrow 3.5N_2 + 6H_2O$$

The SCR process significantly reduces NOx, forming water vapor ($H_2O$) and nitrogen gas ($N_2$).

The ability of the SCR catalyst to absorb NH3 is a function of temperature, with storage capacity decreasing with increasing SCR catalyst temperatures. To attain good NOx conversion efficiency of the SCR catalyst, especially at a lower range of operating temperatures, the SCR catalyst must be maintained with an excess amount of NH3 stored in the catalyst. However, as SCR catalyst temperature increases, stored NH3 may be released from the catalyst due to decreasing storage capacity. NH3 release is most sensitive to SCR catalyst temperature transients, where a rapid temperature elevation suddenly reduces the storage capacity, freeing stored NH3. If the NOx input rate is not sufficient to consume the freed NH3 during the thermal transient, the freed NH3 is released out the rear of the SCR catalyst. Release of NH3 affects the calculation of NOx conversion efficiency as the NOx sensor downstream of the SCR catalyst detects the released NH3 as NOx. Furthermore, if a catalyzed diesel particulate filter is present downstream of the SCR catalyst and is sufficiently hot, the NH3 may be oxidized to NOx, thereby increasing the tailpipe NOx.

SUMMARY

A control system includes a temperature module that determines a temperature of a selective catalytic reduction (SCR) catalyst, a derivative module that determines a derivative of the temperature, and a dosing module that regulates a dosage of a reductant supplied to the SCR catalyst to regulate an engine out NOx level. A control module generates control signals based on the temperature derivative, wherein the control signals regulate the amount of $NH_3$ and NOx into the SCR catalyst to reduce reductant release from the SCR catalyst during thermal transients.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
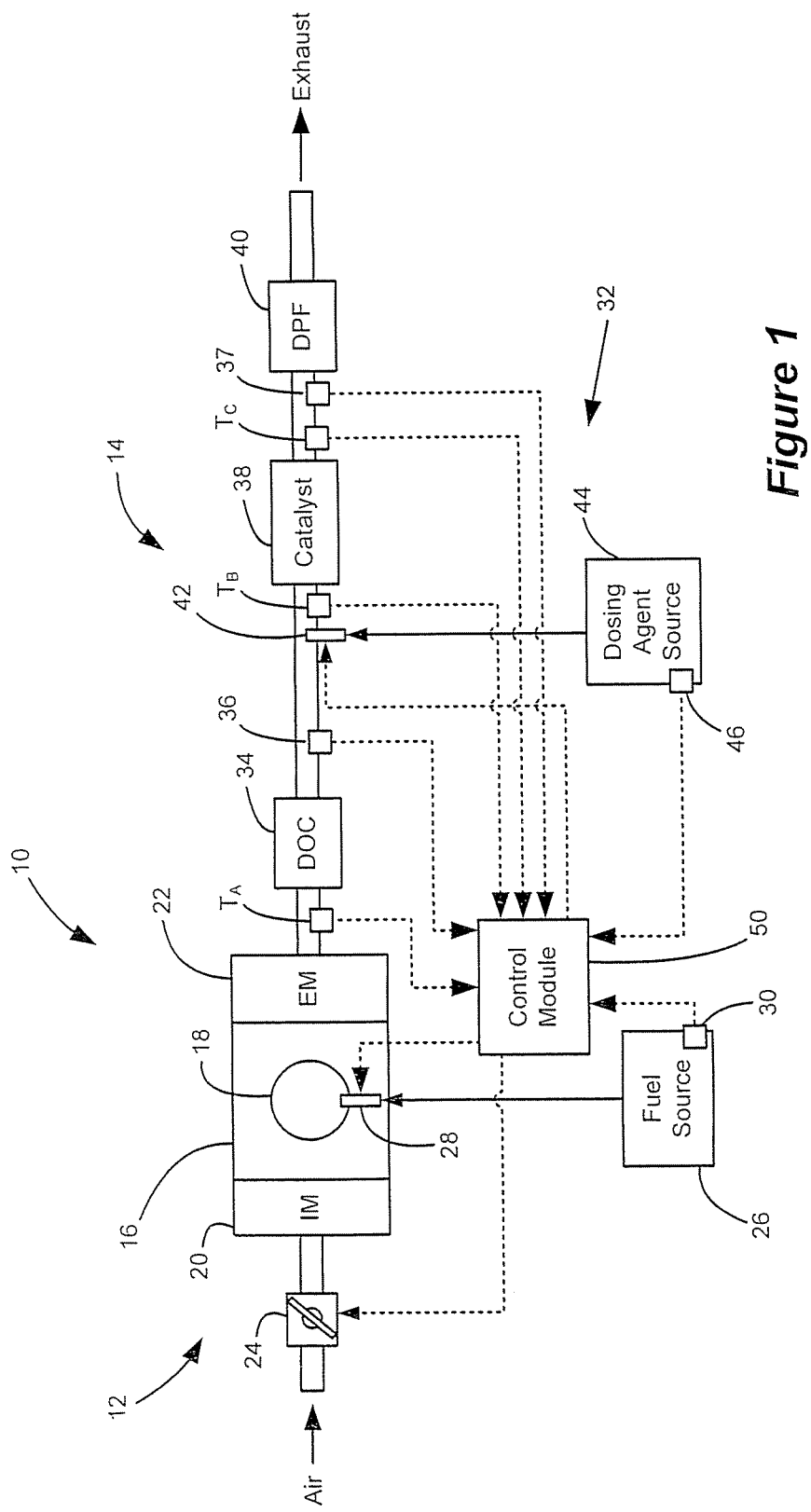
FIG. 1 is a functional block diagram of an engine system including an exhaust treatment system including a selective catalytic reduction (SCR) catalyst.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

United States Application Publication 2006-0130458 describes a method for calculating the required $NH_3$ dosing based on closed-loop control from an upstream NOx sensor and is incorporated by reference herein.

Referring now to FIG. 1, an exemplary vehicle system 10 is schematically illustrated. The vehicle system 10 includes an engine system 12, and an exhaust after-treatment system 14. The engine system 12 includes, for example, a diesel engine 16 having a cylinder 18, an intake manifold 20 and an exhaust manifold 22. Air flows into the intake manifold 20 through a throttle 24. The air is mixed with fuel and the air and fuel mixture is combusted within the cylinder 18 to drive a piston (not shown). Although a single cylinder 18 is illustrated, it is appreciated that the diesel engine 12 may include additional cylinders 18. For example, engines having 2, 3, 4, 5, 6, 8, 10, 12 and 16 cylinders are anticipated. The fuel is provided from a fuel source 26 and is injected into the air stream using an injector 28. A fuel level sensor 30 is responsive to the amount of fuel within the fuel source 26.

Exhaust is produced through the combustion process and is exhausted from the cylinder 18 into the exhaust manifold 22. The exhaust after-treatment system 14 treats the exhaust flowing therethrough to reduce emissions before being released to the atmosphere. The exhaust after-treatment system 14 includes a dosing system 32, a diesel oxidation catalyst (DOC) 34, a first NOx sensor 36, a second NOx sensor 37 and an $NH_3$ selective catalytic reduction (SCR) catalyst 38.

The first NOx sensor 36 is deemed the upstream NOx sensor and the second NOx sensor 37 is deemed the downstream NOx sensor, relative to the SCR catalyst 38. Both NOx sensors 36, 37 are responsive to a NOx level of the exhaust and generate respective signals based thereon.

Temperature sensors $T_A$, $T_B$ and $T_C$ are located at various points along the emissions path. For example, the temperature sensor $T_A$ is located upstream of the DOC 34, the temperature sensor $T_B$ is located upstream of the SCR catalyst 38 and the temperature sensor $T_C$ is located downstream of the SCR catalyst 38. The DOC 34 reacts with the exhaust to reduce emission levels of the exhaust. It is also anticipated that a diesel particulate filter (DPF) 40 may be located downstream from the SCR catalyst 38 that filters diesel particulates to further reduce emissions.

The dosing system 32 includes a dosing agent injector 42, a dosing agent storage tank 44 and a dosing agent level sensor 46. The dosing system 32 selectively injects a dosing agent (e.g., urea) into the exhaust stream to further reduce emissions. More specifically, the rate at which the dosing agent is injected into the exhaust stream is determined based on the signals generated by one or more of the various sensors described herein. NOx sensors 36, 37 are used to determine NOx conversion efficiency and to determine proper urea dosing quantities as applied by the dosing agent injector 42. The exhaust and dosing agent mixture reacts within the SCR catalyst 38 to reduce the exhaust NOx emissions.

A control module 50 monitors SCR catalyst 38 temperature and computes derivatives as further described below to generate a multiplier signal and an offset signal. The multiplier signal modifies the urea dosage rate set by the dosing system 32. The offset signal regulates the mass air flow rate (e.g., by controlling an EGR system (not shown) based on the offset signal) to regulate the quantity of NOx available to react with NH3 accumulated within the SCR catalyst 38. Together the multiplier signal and offset signal act to reduce NH3 release from the SCR catalyst 38 during thermal transients.

While the multiplier signal may reduce the urea dosage rate in response to a temperature transient, reducing the urea dosage rate to zero may not be sufficient to prevent NH3 release due to excess NH3 in the SCR catalyst 38. To further aid the reduction of stored NH3, the offset signal increases the quantity of available NOx to react with the available stored NH3. Control module 50 may also monitor the level of NH3 accumulated within the SCR catalyst 38. Based on the level of accumulated NH3, control module 50 may alter the correction signals to further regulate NH3 accumulated within the SCR catalyst 38, optimizing the absolute level of the urea multiplier and NOx offset signals. In other words, the correction signals provide NH3 "quantity sensitive" dosage modifier signals and offset signals.

Figure 2:
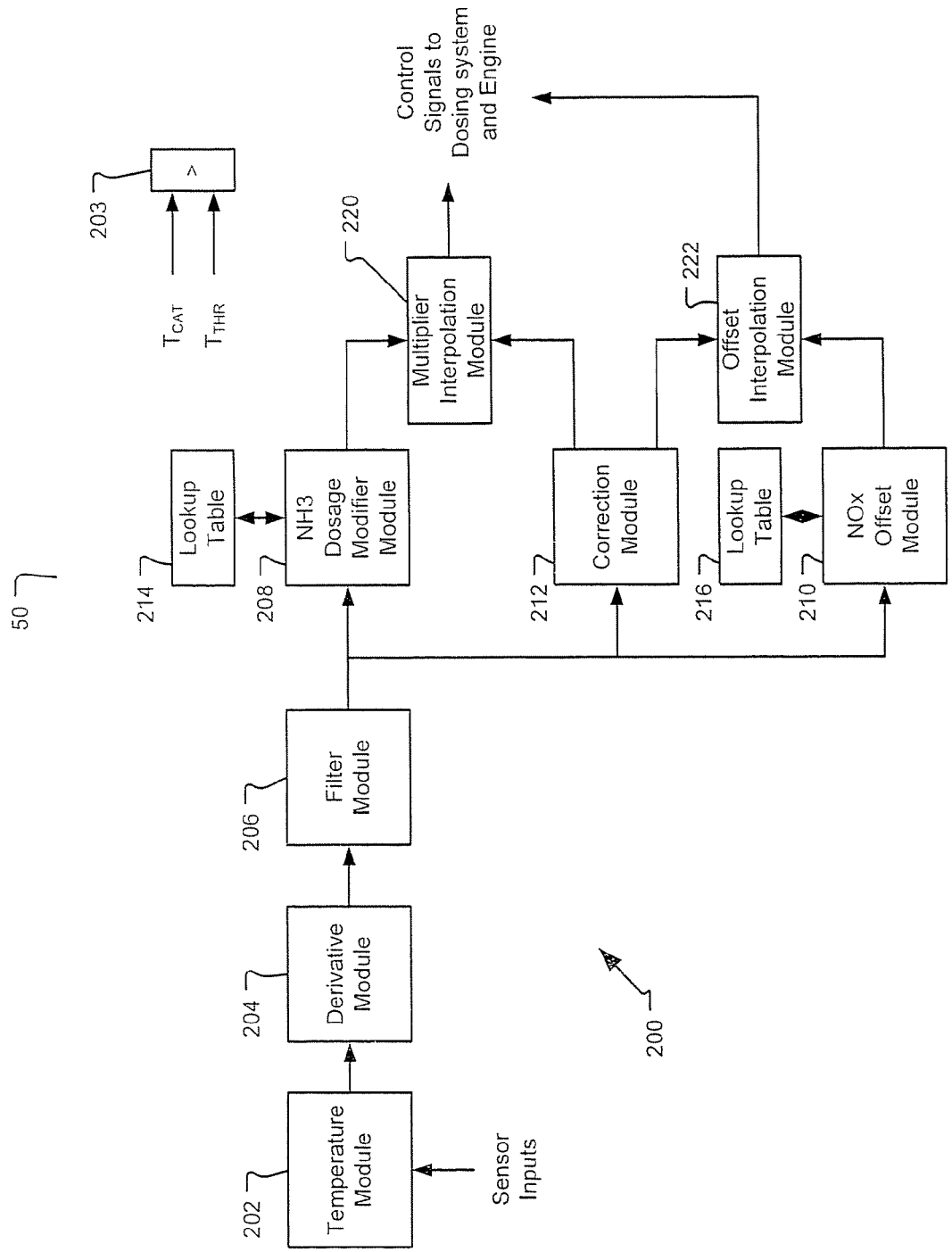
FIG. 2 is a functional block diagram of exemplary modules of an NH3 release control system.

Referring now to FIG. 2, a functional block diagram of exemplary modules that regulate the accumulated level of NH3 in the SCR catalyst 38 in response to temperature transients is schematically illustrated. Control module 50 includes a thermal transient NH3 quantity and feed gas NOx control system (NH3 control) 200 that includes a temperature module 202 monitoring the SCR catalyst's 38 temperature (TCat). The TCat may be determined through direct measurement of the inlet temperature with temperature sensor $T_A$ or an average of the inlet and outlet temperatures as measured by the temperature sensors $T_B$ and $T_C$ respectively. One skilled in the art will understand that rather than direct measurement, TCat may be estimated or modeled.

When TCat is above a threshold temperature, as determined by a comparator module 203, control signals are produced by the NH3 control system 200 to reduce NH3 release due to temperature transients. The threshold temperature may be different for each individual SCR catalyst. The threshold temperature may be set according to different engine operating modes and/or with consideration of the point in an SCR catalyst temperature trace where a release of NH3 is minimized as evidenced by a slope change in the maximum storage curve. A derivative module 204 generates a derivative of TCat (dTCat). A filter module 206 provides filtering to prevent the derivative signal, dTCat, from spiking from noise. A filter constant is chosen sufficient to prevent temperature spikes (i.e. noise) from creating an artificially high derivative signal output. One skilled in the art may choose from a wide variety of digital filters capable of removing spikes from the derivative signal.

The filtered derivative signal is transmitted to a dosage modifier module 208, an offset module 210 and a NH3 storage correction module 212. The dosage modifier module 208 generates a scheduled multiplier signal as a function of the rate of change of temperature, for example, by accessing a lookup table 214 with the derivative signal. The scheduled multiplier represents a maximum correction for a high level of storage. The scheduled multiplier signal may be a value from 0 to 1, with for example, a value of 1 providing no modification, allowing the urea dosing rate, as determined by the dosing system 32, to remain unchanged. A multiplier signal of zero provides full modification, allowing no urea to be injected by the dosage agent injector 42 itself.

The NOx offset module 210 generates a scheduled offset signal as a function of a rate of change of temperature, for example, by accessing a lookup table 216 with the derivative signal. The scheduled offset signal modifies an air flow setpoint (which controls EGR and therefore engine out NOx) which is also a function of a rate of change of temperature. The scheduled offset signal may be a value from 0 to y, with a value of 0 providing no modification to the air flow setpoint, that is, no modification, and a value of y providing a maximum modification to the air flow setpoint. For example, to aid in consuming the NH3 faster, as the SCR catalyst 38 temperature increases, the EGR rate is decreased to provide more NOx. The EGR rate is decreased by increasing the air flow setpoint through the offset signal.

The NH3 storage correction module 212 generates a correction signal based on a determined quantity of NH3 in the SCR catalyst 38. For example, the multiplier correction signal may be a value from 0 to 1 determined as a storage ratio of the amount of NH3 stored in the SCR catalyst 38. The 0 value provides maximum correction to the dosing system 32 when the quantity of NH3 in the SCR catalyst 38 is above a threshold. It insures that minimum urea is injected by the dosage agent injector 42. A value of 1 provides no correction to the scheduled multiplier signal when the quantity of NH3 in the SCR catalyst 38 is below a threshold. A value of 0 provides no correction to the schedule offset signal.

The multiplier interpolation module 220 generates a modified multiplier signal based on the scheduled multiplier signal and the correction signal. For example, the correction signal is used to interpolate the scheduled multiplier signal between no correction (1) and the value of the scheduled multiplier signal (the maximum correction representing the high level of storage).

The offset interpolation module 222 generates a modified offset signal based on the scheduled offset signal and the correction signal. For example, the correction signal is used to interpolate the scheduled offset signal between no correction (0) and the value of the scheduled offset signal (the maximum correction representing the high level of storage).

The modified multiplier signal, generated by the multiplier interpolation module 220, will be transmitted to the dosing system 32 to be applied to the control signal regulating the urea dosing quantity. The modified offset signal, generated by the offset interpolation module 222, will be transmitted to the engine module and will be used to adjust the level of NOx, matching the available NH3, to help prevent NH3 release. One skilled in the art will note that while signals are multiplied in the disclosure, an alternative embodiment could sum the control signals generated by the control module 50 with the control signals generated by the dosing system 32. The control signals produced by the control module 50 may also be used elsewhere within the engine control to modify the urea dosing quantity and air flow setpoint.

The lookup tables 214, 216 are calibrated for maximum NH3 storage of the SCR catalyst 38 at the beginning of the temperature ramp. The lookup tables may be calibrated by running various speed vs. load ramps or transient cycles where NH3 release occurs and modifying the table entries to minimize NH3 release.

Figure 3:
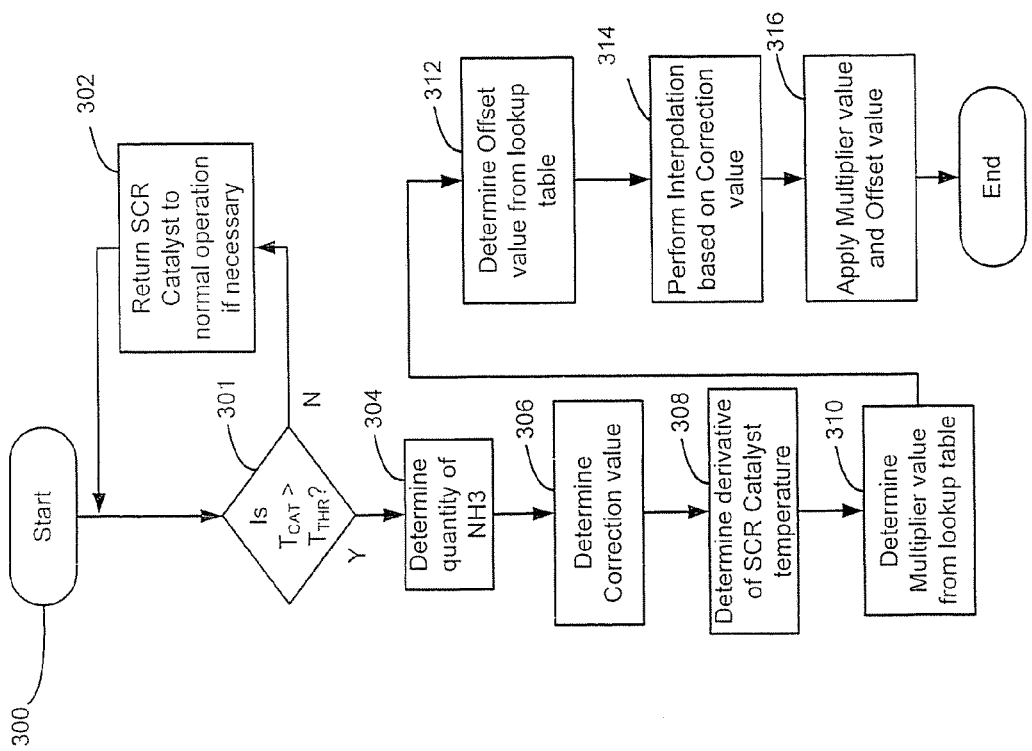
FIG. 3 is a flowchart illustrating exemplary steps that are executed by the NH3 Release control system of the disclosure.

Referring now to FIG. 3, a flowchart illustrating steps to regulate NH3 contained on the SCR catalyst 38 is shown. Control begins in step 300. At step 301, control determines whether the SCR catalyst 38 temperature is greater than a threshold temperature value. If the SCR catalyst 38 temperature is less than or equal to the threshold temperature then control proceeds to step 302 and returns the SCR catalyst 38 to normal operation if not already there. If the SCR catalyst 38 temperature is greater than the threshold temperature, control proceeds to step 304.

In step 304, control determines a current quantity of NH3 present in the SCR catalyst 38 and proceeds to step 306.

In step 306, control determines correction value based on the stored quantity of NH3 then proceeds to step 308. In step 308, control determines a derivative of the SCR catalyst 38 temperature, providing a rate of temperature change, then continues on to step 310.

In step 310, control determines a multiplier for the urea flow signal based on the SCR catalyst 38 temperature derivative and continues on to step 312.

In step 312, control determines an offset for the engine MAF signal based on the SCR catalyst 38 temperature derivative then continues on to step 314.

In step 314, the final multiplier and offset values for both urea flow and MAF are determined by interpolating between full correction and no correction based on the correction value determined in step 304, 306.

In step 316, control transmits the corrected multiplier signal to the dosage system 32 to modify the dosing agent injector 42 control signals. The corrected offset signal is used to modify the air flow setpoint. Then control ends. It is anticipated, however, that the above-described, exemplary control will continue to loop through steps 300 to 316 at a predetermined time interval or rate while the engine is running.

Figure 4:
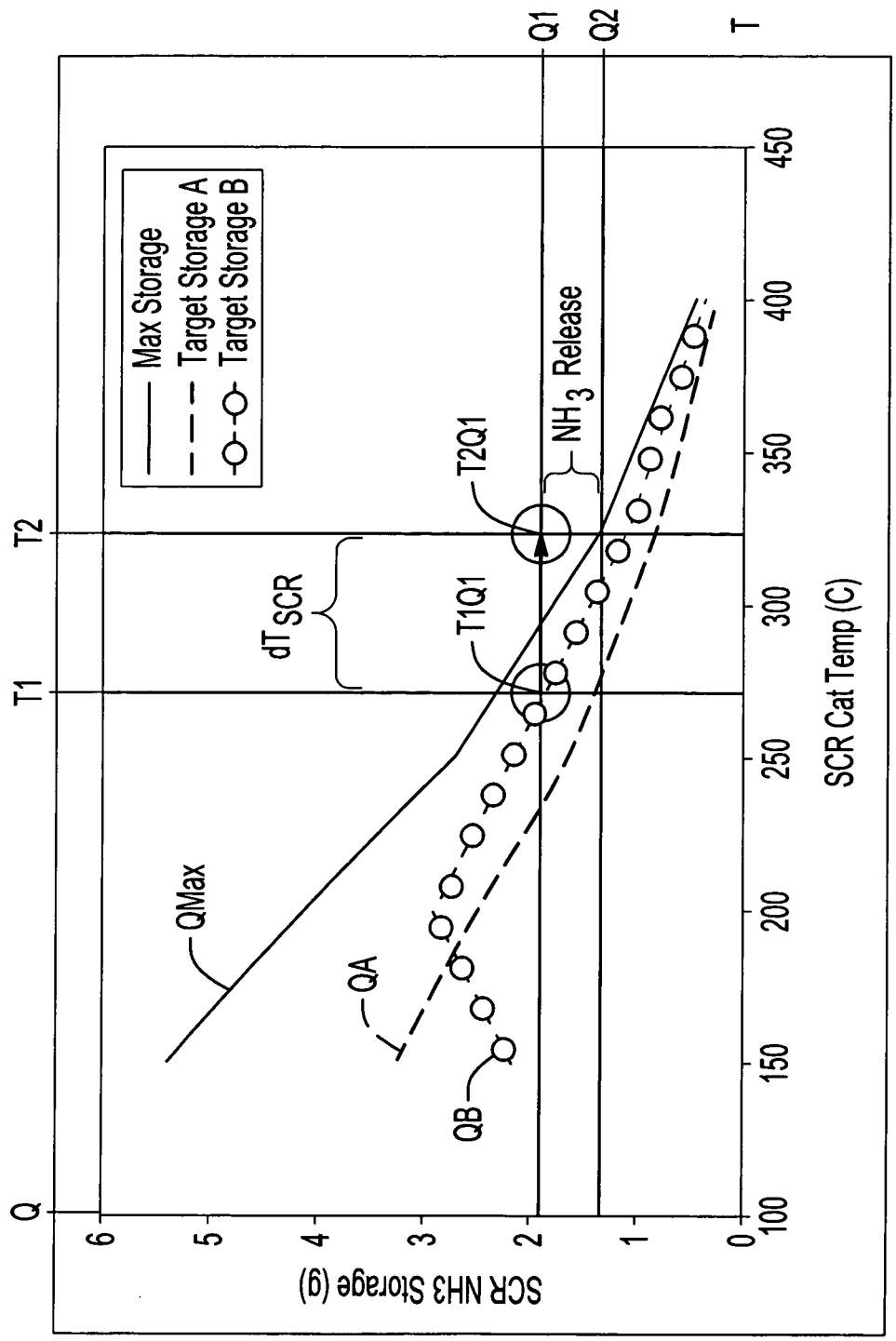
FIG. 4 is a graph illustrating the effects of SCR catalyst temperature change over time on the SCR catalyst NH3 storage capacity.

Referring now to FIG. 4, a sample plot shows exemplary NH3 storage quantities with respect to SCR catalyst 38 temperature while the SCR catalyst 38 undergoes a temperature transient. A horizontal axis T represents temperature in degrees Centigrade. A vertical axis Q is scaled in grams of NH3. An SCR catalyst NH3 quantity trace, QMax, indicates the maximum quantity of NH3 the catalyst may store by temperature. Quantity traces QA and QB represent exemplary operational target quantities of NH3 with regards to catalyst temperature. Intersection points T1Q1 and T2Q1 demonstrate the effect a catalyst temperature change from T1 to T2 has on the storage capacity of the SCR catalyst 38 and the possibility of resulting NH3 release. FIG. 4 illustrates the effect of a thermal transient from T1 to T2, carrying the NH3 quantity trace Q1 from T1Q1 to T1Q1, resulting in an NH3 release of (Q1−Q2), or the difference between the current NH3 quantity and the new storage capacity of the SCR catalyst 38.

Engine load condition changes may create temperature transients with a rate of change high enough such that the quantity of available NH3 will exceed the available NOx. The excess quantity of NH3 may be released if sufficient NOx is not available. Therefore, the current dosage of NH3 supplied to the SCR catalyst 38 may be reduced and/or the quantity of available NOx increased, depending on the rate of temperature change and current quantity of NH3 present on the SCR catalyst 38.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
a first electronic circuit configured to determine a temperature of a selective catalytic reduction (SCR) catalyst;
a second electronic circuit configured to determine a derivative of said temperature;
a third electronic circuit configured to regulate a dosage of a reductant supplied to said SCR catalyst; and
a fourth electronic circuit configured to generate control signals to adjust operation of the third electronic circuit and to regulate an engine out nitrogen oxide (NOx) level based on said temperature derivative and a quantity of said reductant within said SCR catalyst.

2. The control system of claim 1 wherein said control signals are used to regulate an amount of said reductant accumulated within said SCR catalyst to reduce reductant release from said SCR catalyst during thermal transients.

3. The control system of claim 2 wherein said fourth electronic circuit includes a fifth electronic circuit configured to generate a multiplier signal based on said temperature derivative, wherein said multiplier signal is used to adjust a dosing quantity of reductant supplied by the third electronic circuit to regulate said reductant accumulated within said SCR catalyst and reduce said reductant release.

4. The control system of claim 3 wherein said fourth electronic circuit includes a sixth electronic circuit configured to generate an offset signal based on said temperature derivative, wherein said offset signal is used to adjust an air flow setpoint, increasing NOx to match the accumulated reductant.

5. The control system of claim 4 wherein said fourth electronic circuit includes a seventh electronic circuit configured to generate a correction signal based on said quantity of said reductant within said SCR catalyst, wherein said correction signal is used to modify said multiplier signal and said offset signal in response to said quantity of said reductant.

6. The control system of claim 1 wherein said fourth electronic circuit refrains from adjusting said reductant dosage and said engine out NOx level based on said temperature derivative while said SCR catalyst temperature is below a temperature threshold.

7. The control system of claim 1 wherein said SCR catalyst temperature includes one of an SCR catalyst inlet temperature and an average SCR catalyst temperature, wherein said average temperature is the average between said inlet temperature and an SCR catalyst outlet temperature.

8. The control system of claim 1 wherein said SCR catalyst temperature is determined by one of a direct temperature measurement and a temperature estimation.

9. The control system of claim 1 wherein said reductant includes urea.

10. The control system of claim 1 wherein values of said temperature derivative are digitally filtered with filter constants sufficient to remove increased values of said temperature derivative due to noise.

11. The control system of claim 1 wherein said control signals are determined by accessing one of a plurality of lookup tables with values of said temperature derivative.

12. The control system of claim 11 wherein said plurality of lookup tables are calibrated by determining reductant release at various temperatures and changing table entries to minimize the reductant release.

13. The control system of claim 1, wherein the first, second, third, and fourth electronic circuits include at least one of an Application Specific Integrated Circuit (ASIC), a processor and memory including one or more programs, and a combinational logic circuit.

14. A method of reducing reductant release in an SCR catalyst during thermal transients, comprising:
determining a temperature of said SCR catalyst;
determining a derivative of said temperature;
generating control signals based on said temperature derivative;
regulating a dosage of a reductant supplied to said SCR catalyst based on said temperature derivative and a quantity of said reductant within said SCR catalyst and
regulating an engine out nitrogen oxide (NOx) level based on said temperature derivative.

15. The method of claim 14 further including regulating said reductant accumulated within said SCR catalyst to reduce said reductant release during thermal transients.

16. The method of claim 15 wherein said generating control signals includes generating a multiplier signal based on said temperature derivative, wherein said multiplier signal is used to adjust said dosage of said reductant to regulate said reductant accumulated within said SCR catalyst and reduce said reductant release.

17. The method of claim 16 wherein said generating control signals includes generating an offset signal based on said temperature derivative, wherein said offset signal is used to adjust an air flow setpoint, increasing nitrogen oxide (NOx) quantities to match said accumulated reductant.

18. The method of claim 17 wherein said generating control signals includes generating a correction signal based on said quantity of said reductant within said SCR catalyst, wherein said correction signal is used to modify said multiplier signal and said offset signal to further regulate said accumulated reductant within said SCR catalyst and reduce said reductant release.

19. The method of claim 14 further comprising refraining from adjusting said reductant dosage based on said temperature derivative while said SCR catalyst temperature is below a temperature threshold.

20. The method of claim 14 where said reductant includes urea.

21. The method of claim 14 wherein said determining of said SCR catalyst temperature includes one of directly measuring said SCR catalyst temperature and estimating said SCR catalyst temperature.

22. The method of claim 14 further comprising filtering said temperature derivative of temperature measurement to remove increased values of said temperature derivative due to noise.

* * * * *